(12) United States Patent
Natsume

(10) Patent No.: US 6,505,961 B2
(45) Date of Patent: Jan. 14, 2003

(54) METHOD OF EVALUATING BASIC CURVED SURFACE FOR REFLECTING MIRROR, EVALUATION SYSTEM FOR EVALUATING BASIC CURVED SURFACE FOR REFLECTING MIRROR, AND COMPUTER-READABLE STORAGE MEDIUM

(75) Inventor: Kazunori Natsume, Shimizu (JP)

(73) Assignee: Koito Manufacturing Co., Ltd., Tokyo (JP)

(*) Notice: Subject to any disclaimer, the term of this patent is extended or adjusted under 35 U.S.C. 154(b) by 5 days.

(21) Appl. No.: 09/765,367

(22) Filed: Jan. 22, 2001

(65) Prior Publication Data

US 2001/0009354 A1 Jul. 26, 2001

(30) Foreign Application Priority Data

Jan. 20, 2000 (JP) ........................................ 2000-012069

(51) Int. Cl.⁷ ............................................... G01B 13/18
(52) U.S. Cl. ...................... 362/460; 362/509; 362/517; 362/518; 362/327; 362/334; 362/361; 345/102
(58) Field of Search ................................ 362/460, 509, 362/517, 518, 327, 334, 337, 346, 347, 361; 359/868, 869, 858, 863; 345/102

(56) References Cited

U.S. PATENT DOCUMENTS

| | | | |
|---|---|---|---|
| 4,481,563 A | 11/1984 | Snyder et al. | 362/296 |
| 4,495,552 A | 1/1985 | Graff | 362/297 |
| 4,706,173 A | 11/1987 | Hamada et al. | |
| 4,959,757 A | 9/1990 | Nakata | 362/61 |
| 5,065,287 A | 11/1991 | Staiger et al. | 362/61 |
| 5,655,828 A | 8/1997 | Yamamoto et al. | 362/61 |
| 5,707,141 A | 1/1998 | Yamamoto et al. | 632/305 |
| 5,727,874 A | 3/1998 | Yamamoto et al. | |
| 5,779,340 A | 7/1998 | Maeda | |
| 5,836,668 A | 11/1998 | Ishikawa et al. | 632/61 |
| 5,931,575 A * | 8/1999 | Yamamoto et al. | 362/215 |
| 5,940,308 A * | 8/1999 | Ishikawa et al. | 703/8 |

FOREIGN PATENT DOCUMENTS

| | | | |
|---|---|---|---|
| EP | 0 430 470 A2 | 6/1991 | |
| GB | 2 262 980 B1 | 7/1993 | |
| GB | 2 360 378 B1 | 9/2001 | |
| JP | 9-33708 | 2/1997 | G02B/5/10 |

* cited by examiner

*Primary Examiner*—Stephen Husar
*Assistant Examiner*—Bertrand Zeade
(74) *Attorney, Agent, or Firm*—Sughrue Mion, PLLC

(57) ABSTRACT

There are provided a method of evaluating a basic curved surface for a reflecting mirror, an evaluation system for evaluating a basic curved surface for a reflecting mirror, and a computer-readable storage medium on which a program is recorded. There are provided a step (105a) of entering light source information on a light source and design information representative of a basic curved surface, and a step (105e) of displaying closed curved lines on a display device. The closed curved line data represents one or more closed curved lines which are included in one or more planes intersecting an axis Ax as well as in the basic curved surface. The axis Ax is determined to extend in a direction in which light from a light source is to be reflected by a reflecting mirror and to pass through a light source position defined by the light source information. The closed curved line data can be generated by obtaining lines of intersections of the plains and the basic curved surface. By displaying these cross sections, the schematic shape of the basic curved surface is visibly grasped with respect to the direction in which light from the light source is to be reflected.

18 Claims, 11 Drawing Sheets

METHOD OF EVALUATING BASIC CURVED SURFACE FOR REFLECTING MIRROR, EVALUATION SYSTEM FOR EVALUATING BASIC CURVED SURFACE FOR REFLECTING MIRROR, AND COMPUTER-READABLE STORAGE MEDIUM

BACKGROUND OF THE INVENTION

1. Field of the Invention

The present invention relates to a method of evaluating a basic curved surface for a reflecting mirror to be applied to a vehicle lamp, an evaluation system for evaluating a basic curved surface for a reflecting mirror, and a computer-readable medium storing a program for enabling a computer to execute evaluation of a basic curved surface for a reflecting mirror to be applied to a vehicle lamp.

2. Related Background Art

A vehicle lamp comprises a light source, reflecting mirror for obtaining approximately parallel light from the light source, and a lens disposed in front of the reflecting mirror.

Recently, vehicles, incorporating the vehicle lamps, have been designed in their various shapes so that the shapes of vehicles become more attractive. This design requires the vehicle lamp to satisfy shape restrictions arising from conditions, such as the external shapes of the vehicles and a accommodation space required for the vehicle lamp, i.e., the requirement that the vehicle lamps have to be arranged in predetermined accommodation spaces with the attractive shapes of the vehicles being retained.

In the development of the vehicle lamps, it is necessary to determine the shape of the reflecting mirrors while taking such requirement into account. Thus, the reflecting mirrors of the vehicle lamps are composed of reflecting surface having, for example, a paraboloid of revolution or a multiple paraboloid, in order to obtain the desired reflection performance.

SUMMARY OF THE INVENTION

The lamps of automobiles have recently been required to achieve the shape restrictions that the lamps should be accommodated within the desired volume of the vehicles. In addition, the lamps have been required to achieve better optical performance than those in prior arts. To satisfy these requirements, the following configurations are adopted: (1) a reflecting mirror is composed of a plurality of reflecting surfaces; and (2) in determining the arrangement of the reflecting surfaces, a basic curved surface is determined to satisfy the shape restrictions and then the plurality of reflecting surfaces are disposed on this basic curved surface to form the reflecting mirror.

The present inventors have examined the design of this reflecting mirror and has discovered the following problems that occur when a reflecting mirror is provided with the improvement in the achievement of the requirements from the optical performance of the vehicle lamp while the requirement from the shape restrictions for the vehicle is satisfied. The inventors have also found that the optical performance of the reflecting mirror is separated into (1) the optical performance associated with the shape of the basic curved surface, and (2) the optical performance associated with the shapes and arrangements of the plurality of the reflecting surfaces. These optical performances of the reflecting mirror have been evaluated after the designing of the reflecting mirror proceeds to a particular stage of the design.

As the results of the inventors' further examination for the two separate performances above, the inventors have discovered that these performances have the following characteristics: the evaluation of performance item (2) can not be made until the shape and arrangement of the individual reflecting surfaces are determined; and the performance item (1) can be, however, evaluated after the basic curved surface has been determined.

In other words, if we have an appropriate technique for evaluating the performance item (1), wasteful repetition in designing the reflecting mirror can be removed. In addition, since a accommodating space for a vehicle lamp is different from others, the basic curved surface to be designed for the vehicle lamp is also different from the others. If the optical performance of a basic curved surface can be evaluated by the use of such a technique at an early stage of a design flow, it will be possible to apply more appropriate feedback to this designing stage in order to obtain far better optical characteristics.

The above-described examinations have shown the following: what is desired is to develop a tool which can support the designing of basic curved surfaces that depends on the designers' experiences; and it is also desired to evaluate optical performance at a predetermined design stage.

It is, therefore, an object of the present invention to provide as follows: a method of evaluating a basic curved surface for a reflecting mirror to be applied to a vehicle lamp; an evaluation system for evaluating a basic curved surface for a reflecting mirror; and a computer-readable medium storing a program for enabling a computer to execute evaluation of a basic curved surface for a reflecting mirror to be applied to a vehicle lamp.

The present inventors has made various examinations as to an evaluation method and an evaluation system, both of which are applicable to the evaluation of the optical performance of basic curved surfaces. The present invention will be constructed to have the following features. The present invention also has several aspects, as will be described below; a method of evaluating a basic curved surface, an evaluation system, a computer-readable medium storing a program.

One aspect of the present invention is a method of evaluating a basic curved surface for a reflecting mirror to be applied to a vehicle lamp. The method comprises the steps of: (a) entering light source information on a light source and design information indicative of the basic curved surface; and (b) displaying, on a display device, closed curved line data representative of one or more closed curved lines, the closed curved lines being included both in one or more planes intersecting a predetermined axis and in the basic curved surface. The predetermined axis is determined to extend in a direction in which light from the light source is to be reflected by the reflecting mirror, and passes through a light source position included in the light source information.

A computer program realizing this method includes a first input process provided so as to realize step (a) and a display process provided so as to realize step (b). This program enables a computer to execute evaluation of a basic curved surface for a reflecting mirror to be applied to a vehicle lamp. The program can be recorded on a computer-readable storage medium.

Another aspect of the present invention is an evaluation system for evaluating a basic curved surface for a reflecting mirror to be applied to a vehicle lamp. The invention comprises: (1) a memory; (2) a display device; (3) first entering means for entering design information indicative of the basic curved surface and light source information on a light source to store the information in the memory; and (4) first transmitting means for transmitting, to the display device, closed curved line data representative of one or more closed curved lines, the closed curved lines being included both in the basic curved surface and in one or more planes intersecting a predetermined axis.

Since the curved lines are included both in the basic curved surface and in the planes intersecting the predetermined axis, the shape of the curved lines reflect the shape of the basic curved surface thereon. When this shape is displayed, evaluation information for the shape of the basic curved surface can be provided with respect to the direction of the predetermined axis.

The method of evaluating a basic curved surface for a reflecting mirror to be applied to a vehicle lamp according to the present invention can further comprises the steps of: (c) generating plane surface data indicative of the planes intersecting the predetermined axis; and (d) obtaining one or more lines of intersection of the generated planes and the basic curved surface according to the design information and the plane surface data to form the closed curved line data from the intersection lines.

The program recorded on the computer-readable storage medium can further include a plane surface generating process provided so as to realize the step (c), and intersection line generating process provided so as to realize the step (d).

The evaluation system for evaluating a basic curved surface for a reflecting mirror to be applied to a vehicle lamp according to the present invention comprises (5) plane surface generating means for generating plane surface data indicative of the planes intersecting the predetermined axis, and (6) intersection line generating means for obtaining one or more lines of intersection of the planes and the basic curved surface on the basis of the design information and the plane surface data to form the closed curved line data from the intersection lines.

The closed curved line data can be obtained by generating the plane surface data and then obtaining the lines of intersection of the planes and the basic curved surface.

The method of evaluating a basic curved surface for a reflecting mirror to be applied to a vehicle lamp according to the present invention further comprises the steps of (e) entering plane surface information, the information defining at least one of the following: the number of the planes; and the distance between the planes. The plane surface data is defined to provide a plurality of planes, perpendicular to the axis, which are arranged with the distance and the number defined by the plane surface information.

The program recorded on the storage medium further includes a second input process provided so as to realize the step (e).

An evaluation system for evaluating a basic curved surface for a reflecting mirror to be applied to a vehicle lamp according to the present invention further comprises (7) second entering means for entering plane surface information, the plane surface information defining at least one of the following: the distance between the planes; and the number of the planes.

By defining the distance between plane surfaces to be generated, it is possible to designate the pitch of lines of intersections for representing the schematic shape of the basic curved surface. By defining the number of plane surfaces, it is possible to designate the number of lines of intersections for representing the schematic shape of the basic curved surface. In this manner, it is possible to designate the parameters required to show the schematic shape of the basic curved surface. For example, the planes can be generated to be disposed in parallel with one another. These closed curved lines can show the schematic shape of the basic curved surface by a technique similar to contours.

The method for evaluating a basic curved surface for a reflecting mirror to be applied to a vehicle lamp according to the present invention further comprises the step of (f) erasing the display of the closed curved line data from the display device. The method for evaluating a basic curved surface for a reflecting mirror to be applied to a vehicle lamp according to the present invention further comprises the step of (g) repeating steps (b) to (f).

The program recorded on the storage medium further includes an erasing process provided so as to realize the step (f). The program recorded on the storage medium further includes a repetition process arranged to realize the step (g).

The evaluation system for evaluating a basic curved surface for a reflecting mirror to be applied to a vehicle lamp according to the present invention further includes (8) erasure means for erasing the display of the closed curved line data from the display device.

After the closed curved line data has been erased, another closed curved line data can be displayed on the display. Accordingly, it is possible to repeatedly evaluate the schematic shape of the basic curved surface.

In the method for evaluating a basic curved surface for a reflecting mirror to be applied to a vehicle lamp according to the present invention, step (b) includes a step of displaying the closed curved line data in such a manner that the closed curved line data is superposed on the basic curved surface displayed on the display device.

The program recorded on the storage medium includes a process provided so as to display the closed curved line data such that the closed curved lines is superposed on the basic curved surface displayed on the display device.

The evaluation system for evaluating a basic curved surface for a reflecting mirror to be applied to a vehicle lamp can further comprises (h) second transmitting means for transmitting, to the display device, data containing the design information and corresponding to the basic curved surface.

By displaying the closed curved line data such that the closed curved line data is superposed on the basic curved surface, it is possible to represent the closed curved line data in association with the basic curved surface.

Another aspect of the present invention is a method of designing a basic curved surface for a reflecting mirror to be used in a vehicle lamp. The invention comprises the steps of: (i) determining a basic curved surface defining the reflecting mirror, on the basis of the following: shape restriction conditions to define a accommodation space which can be occupied by the reflecting mirror; and the position restriction conditions to define the position of a light source in the vehicle lamp; (ii) displaying, on a display device, closed curved line data representative of one or more closed curved lines; and (iii) making evaluation of the reflection performance of the basic curved surface on the basis of the displayed closed curved lines. The closed curved lines are included both in the basic curved surface and in one or more planes intersecting an axis. The axis extends in a direction in which light from the light source is to be reflected by the reflecting mirror. The axis also passes through a position at which the light source is to be arranged.

By displaying the closed curved lines, the schematic shape of the basic curved surface can be represented. Accordingly, it is possible to evaluate the reflection performance of the basic curved surface as a whole. This evaluation is made as to whether the basic curved surface is appropriate for use in the vehicle lamp.

The method of designing a basic curved surface for a reflecting mirror to be used in a vehicle lamp according to the present invention can further include the step of (iv) executing the steps (i) to (iii) in response to an evaluation indicating that the basic curved surface is inappropriate for use in the vehicle lamp. This evaluation method provides a sequence of evaluation that allows the basic curved surface to exhibit a reflection performance closer to a predetermined level thereof.

In the method of designing a basic curved surface for a reflecting mirror to be used in a vehicle lamp according to the present invention, the planes can be arranged to be spaced apart at an interval of a first distance. Accordingly, the shape of the basic curved surface can be understood as a whole from the closed curved line data provided at the equal interval on the display.

The method of designing a basic curved surface for a reflecting mirror to be used in a vehicle lamp according to the present invention further comprises the steps of: (v) erasing a displayed image of the closed curved line data from the display device, (vi) generating second plane surface data indicative of a plurality of planes which are arranged at an interval or a second distance smaller than the first distance, the second planes intersecting a predetermined axis, (vii) generating another closed curved line data indicative of lines of intersections of the planes and the basic curved surface according to design information and the second, plane surface data, and (viii) displaying the other closed curved line data on the display device.

Since it is possible to display the other closed curved line data after the displayed closed curved line data has been erased, the basic curved surf ace can be evaluated on a step-by-step basis. Accordingly, it is possible to make accurate evaluation of the part of the shape, and it is also possible to make schematic evaluation of the whole of the shape.

In the method of designing a basic curved surface for a reflecting mirror to be used in a vehicle lamp according to the present invention, step (ii) includes the step of displaying the closed curved line data so as to superpose the closed curved lines on the basic curved surface.

By displaying the closed curved line data so as to superpose the closed curved lines on the basic curved surface, the closed curved line data is visualized in association with the basic curved surface. Therefore, the evaluation can be made while the closed curved line data is compared with the shape conditions of the reflecting mirror.

BRIEF DESCRIPTION OF THE DRAWINGS

The above and other objects, features, and advantages of the present invention will become readily apparent from the following detailed description of the preferred embodiments of the present invention which will be given with reference to the accompanying drawings.

DESCRIPTION OF THE PREFERRED EMBODIMENTS

A vehicle lamp according to the present invention and a method of determining the reflecting surface of a reflecting mirror for the vehicle lamp will be described below in detail in conjunction with the drawings. In the description of the drawings, the same elements are, if possible, denoted by the same references.

A vehicle lamp according to the present embodiment, which will be described below, can be applied to an indicator lamp, such as a tail lamp for an automobile, which is not, however, limited thereto.

Figure 1:
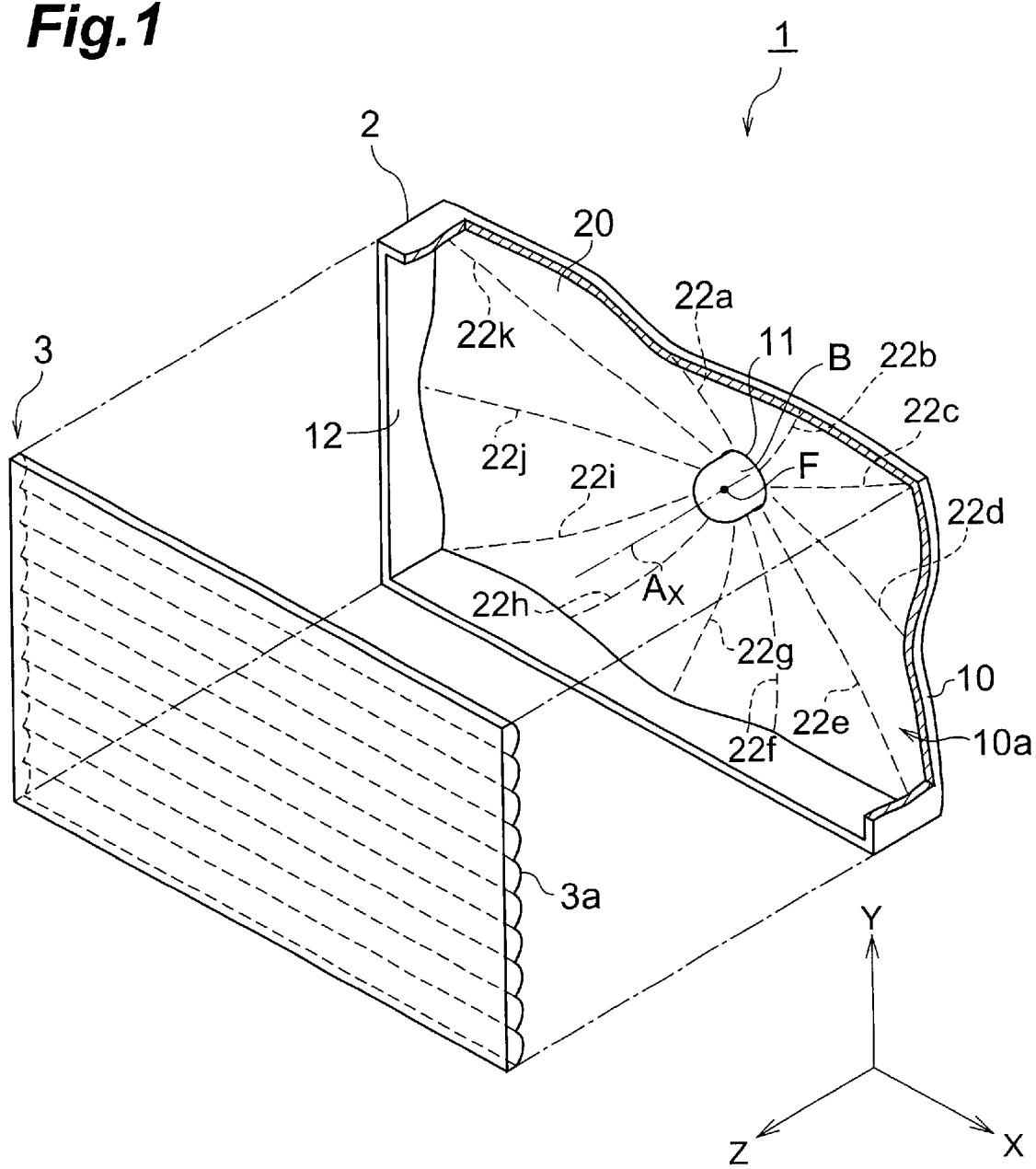
FIG. 1 is a perspective view showing a vehicle lamp in one embodiment according to the present invention.
Figure 2:
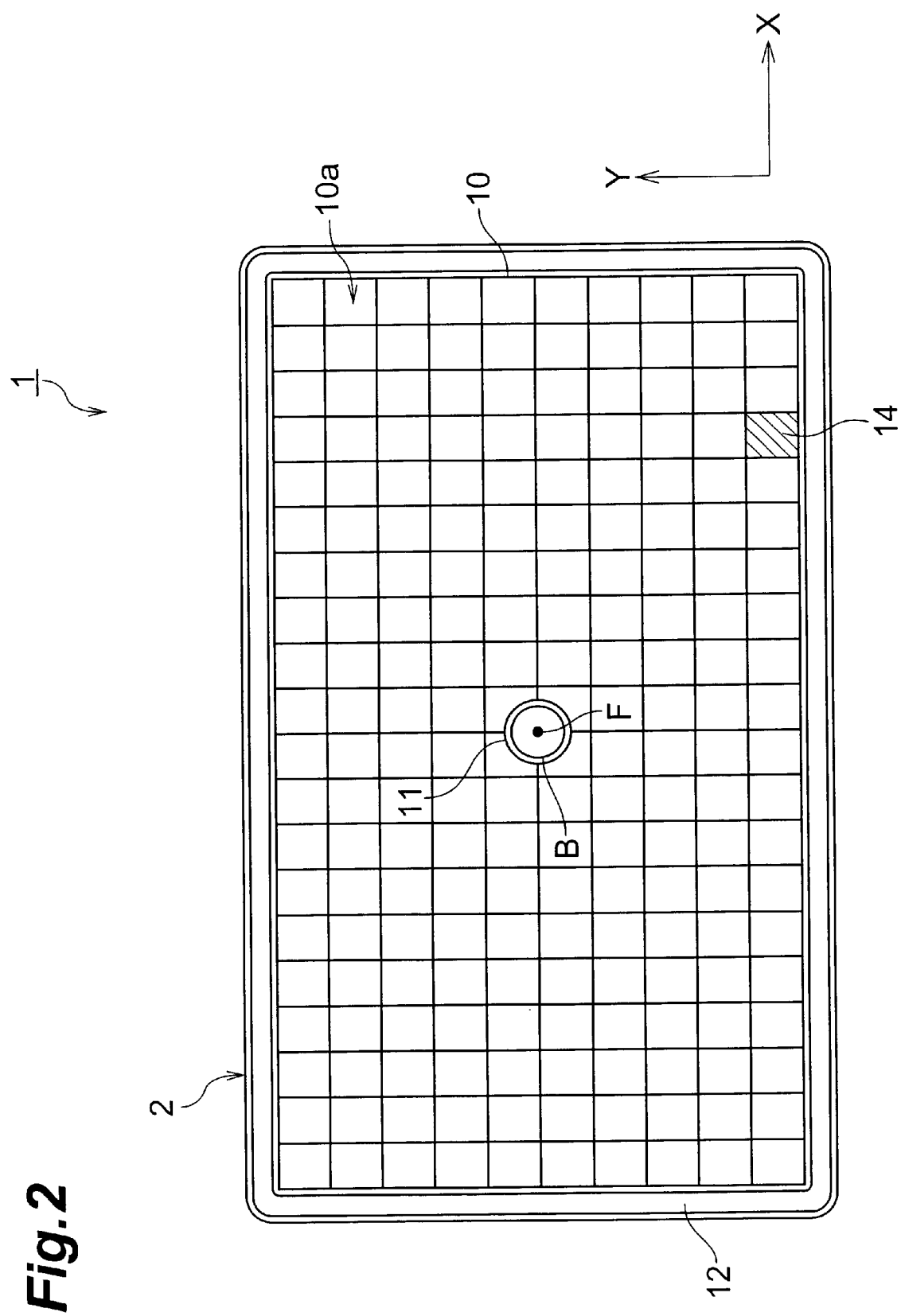
FIG. 2 is a plan view showing the structure of a reflecting mirror for the vehicle lamp shown in FIG. 1.

FIG. 1 is a perspective view showing a vehicle lamp according to the present invention. FIG. 2 is a plan view showing a reflecting mirror of the vehicle lamp shown in FIG. 1. In FIG. 1, there are not shown members for securing and positioning the reflecting mirror and a lens, but those skilled in the art can provide these members as required. In FIGS. 1 and 2, there is shown an XYZ coordinate system. This coordinate system, an orthogonal coordinate system, has Z-axis in the direction of an optical axis Ax of the vehicle lamp.

Referring to FIG. 1, a vehicle lamp 1 comprises a reflecting mirror 2 and a lens 3. The reflecting mirror 2 comprises a reflecting mirror part 10 having a reflecting surface 10a, and external frame part 12.

The reflecting mirror 10 is disposed such that the reflecting surface 10a faces a lens 3. The reflecting surface 10a extends over a plane that intersects the axis Ax at right angles, whereby the reflecting surface 10a can reflect light in the direction of the axis Ax. The external frame part 12 has a tubular portion extending along the axis Ax. The reflecting surface 10a is disposed to close one end of this tubular portion. The external frame part 12 positions the lens 3 with respect to the reflecting surface 10a. The lens 3 is secured at a predetermined angle, for example, at approximate right angles to the axis Ax The axis Ax can be provided so as to coincide with the optical axis of the lamp.

The reflecting mirror part 10 has a hole 11 at a predetermined position on the reflecting surface 10a. A light source bulb B is inserted through the hole 11. The light source bulb B is secured to the reflecting mirror 2 so that a light source point F is positioned at a predetermined position (light source position) on the axis Ax.

In FIG. 1, for the sake of simplicity, there are not reflecting surface elements (indicated in reference numeral 14 of FIG. 2) which constitutes the reflecting surface 10a, and there is shown a basic curved surface, such as a free formed surface 20. Shown on the free formed surface 20 are eleven curved surface reference lines (shown by dashed lines in FIG. 1), 22a to 22k which are used for creating the free formed surface 20.

The free formed surface 20 defines a underlined curved surface (representing basic shape) on which the reflecting surface elements are disposed, and determines the schematic shape of a accommodating space to be occupied by the vehicle lamp 1. A paraboloid of revolution is not available for the free formed surface 20. The free formed surface 20 is determined so as to satisfy shape restriction conditions, required for the vehicle lamp 1, as well as predetermined conditions, for example, that luminous exitance or luminous emittance (which will be described below) from each part on the curved surface falls within a predetermined range. Accordingly, the free formed surface 20 is provided not only to satisfy shape restriction conditions for a vehicle lamp, for example, conditions to accomplish a thin shape, but also to achieve optical performance such as optical uniformity as well as possible.

FIGS. 1 and 2 illustrate the external shape of the reflecting mirror 1 (for example, the shape of the external frame portion 12), the installation angle of the lens 3 with respect to the optical axis Ax, and the arrangement position of the light source bulb B. In individual specific cases, the shape of the vehicle lamp can be determined in view of the design conditions of a vehicle body, i.e., the shape restriction conditions. The shape restriction conditions define, for example, the volume and shape of the lamp accommodating portion of an individual vehicle body as well as the external shape of the lamp which forms a part of the external shape of the vehicle body (in many cases, the external surface of a lens in the lamp). A specific method for manufacturing the reflecting surface 10a of the reflecting mirror 1 is not particularly limited to the present embodiment, and various manufacturing methods can be applied. With respect to vehicle lamps having reflecting mirrors, the subsequent description can be provided by way of example.

The configuration of the reflecting surface 10a will be described below with reference to FIG. 2. The reflecting surface 10a comprises a plurality of segments disposed on the free formed surface 20 which constitutes an underlined base surface. Reflecting surface elements 14 are assigned to the respective segments. In FIG. 2, one of the reflecting surface elements 14 is hatched to explicitly show its region, and each reflecting surface element 14 can be the same shape.

In order to form the reflecting surface elements 14, the free formed surface 20 has been divided into segments, and then a reflecting basic surface is determined for each segments. For example, the reflecting basic surface can include a paraboloid of revolution which has the central axis Ax (refer to FIG. 1) and focus F (refer to the light source position of FIG. 1). In each of the reflecting surface elements 14, the paraboloid of revolution has a focal length determined by the light source point F and a position relative to the reflecting surface element 14 on the free formed surface 20, whereby light from the light source point F can be reflected by the reflecting surface elements 14 in the direction of the axis Ax.

Then, a method of determining the reflecting surface of the reflecting mirror will be described below. This determination method is not limited to the technique that will be described below, and various methods can be applied thereto. In particular, the sequence of determining the free formed surface is not limited to the following description.

Figure 3:
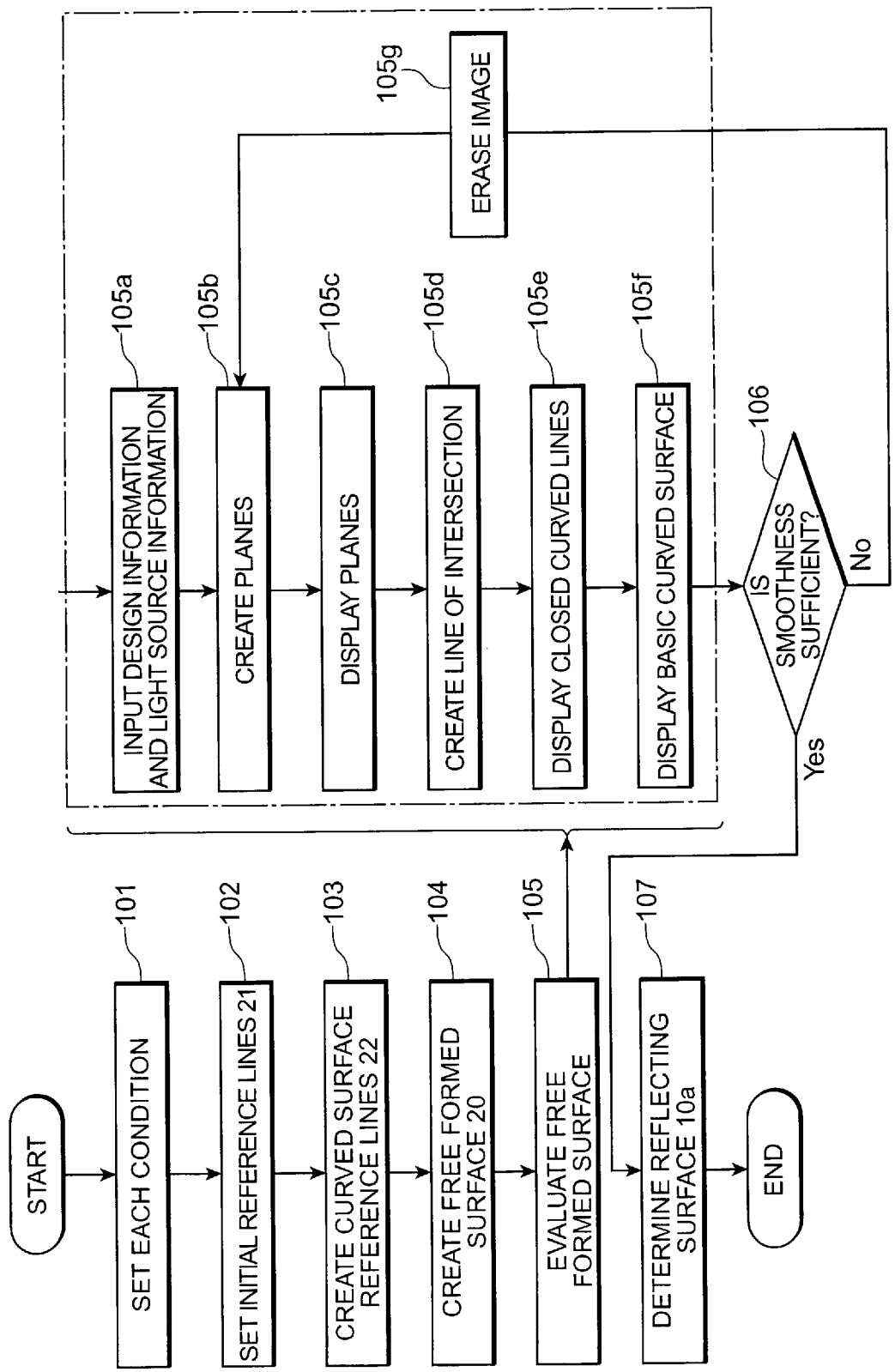
FIG. 3 is a flowchart showing a method of determining the reflecting surface of the reflecting mirror.

FIG. 3 is a flowchart 100 describing a sequence of determining the shape of the reflecting surface 10a of the reflecting mirror 2 used in the vehicle lamp. This sequence 100 has a condition setting step 101, an initial reference line setting step 102, a curved surface reference line creating step 103, a free formed curve creating step 104, a verification step 105, and a reflecting surface determining step 107.

Figure 4A:
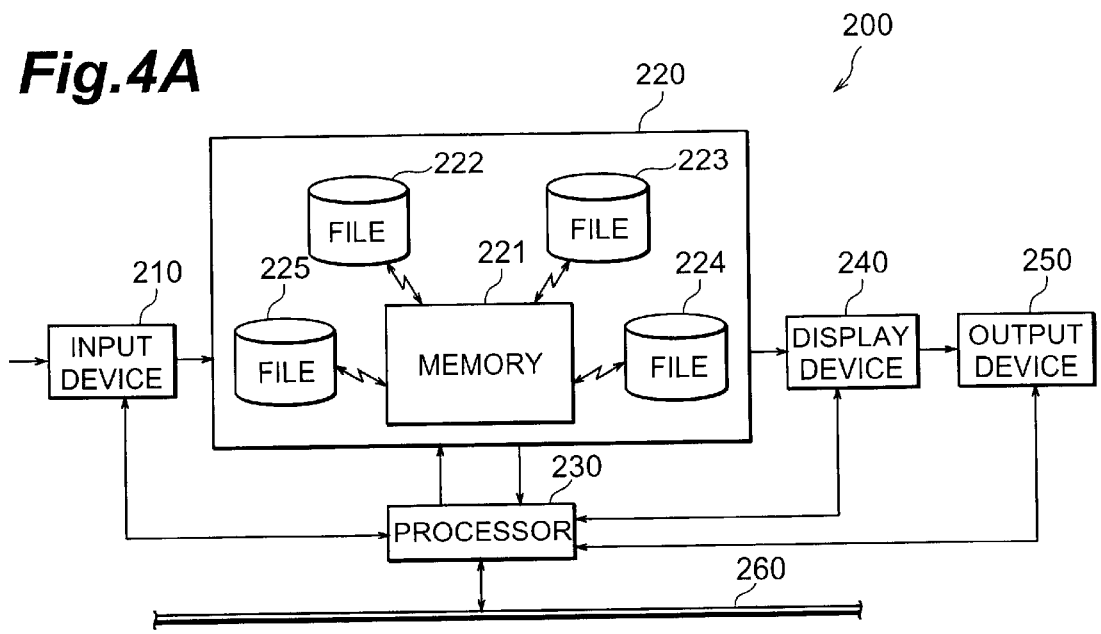
FIGS. 4A and 4B are a schematic block diagram and a functional block diagram showing an evaluation system, respectively.
Figure 4B:
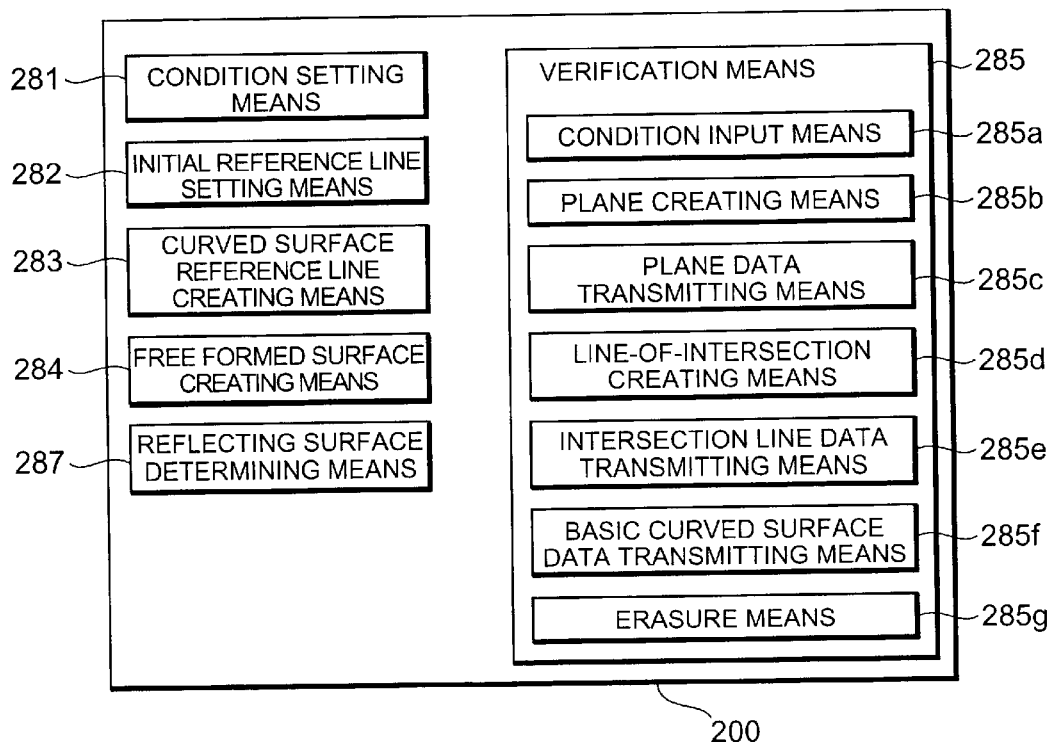

FIGS. 4A and 4B show an evaluation system 200 capable of executing these programs. Referring to FIG. 4A, the evaluation system 200 comprises input device means 210, a memory unit 220, a processor 230, a display device 240 and output device means 250. In addition, the evaluation system 200 can be connected via a network 260 to another evaluation system, such as a computer. The input device means 210 can include one or more input devices, such as a keyboard, a data reading device for a storage medium, and a pointing device. The memory unit 220 has a main storage device 221, which can store a program file 222, a design information file 223, an area division information file 224 and a contour information file 225. The processor 230 can execute a program stored in the memory unit 220. owing to this execution, one or more steps that will be described below are realized on the evaluation system 200. The results of evaluation can be displayed on the display device 240 capable of displaying received data, and can be outputted via the output device means 250. The output device means 250 can include one or more output devices, such as a printer and a writing device to a storage medium.

When a predetermined software is installed from a storage medium, the system 200 is capable of realizing, according to the software, at least one of condition setting means 281, initial reference line setting means 282, curved surface reference line creating means 283, free formed surface creating means 284, verification means 285, and reflecting surface determining means 287, as shown FIG. 4B.

In the system 200, for the convenience of design or for other reasons, design information obtained by a part of the above-described steps can be stored in the system after an arbitrary step. When the stored design information is again provided to the computer, the program can perform the subsequent processes.

The program realizing these processes can be distributed with the program recorded on a predetermined computer-readable storage medium. The storage media contain, but not limited to, a magnetic medium such as a hard disk, a floppy disk and magnetic tape, an optical medium such as a CD-ROM and a DVD-ROM, a magnetooptical medium such as a floptical disk, or a hardware device such as a RAM, a ROM and a semiconductor nonvolatile memory, which is especially arranged to execute or store program commands.

The present embodiment will be described with illustrative reference to the case where the process 100 shown in FIG. 3 is realized by a software, it goes without saying that the process 100 can be realized by a dedicated hardware.

Referring to FIG. 4B, there are shown functional block diagram of the evaluation system 200. These functional blocks will be described below in connection with the respective steps.

CONDITION SETTING STEP 101, CONDITION SETTING MEANS 281

First of all, the condition setting means 281 sets the various conditions necessary for shape determination. The conditions to be set are shown below with reference to FIG. 1 by way of example. These conditions can include: a position at which the light source bulb B is to installed; the position of the light source point F (light source position); and the axis Ax that passes through the light source position F. The axis Ax, passing through the light source position, indicates the direction in which light, emitted from the light source, is reflected off the reflecting surface. These conditions can include others such as the distribution of light from the light source. The conditions also include shape restriction conditions, such as the volume of a vehicle body that can be occupied by the lamp, in addition to these conditions.

INITIAL REFERENCE LINE SETTING STEP 102, INITIAL REFERENCE LINE CREATING MEANS 282

Then, the initial reference line setting means 282 generates a plurality of initial reference lines. The initial reference lines are initial conditions for determining the basic curved surface. Starting from these initial reference lines, the curved surface reference lines 22a to 22k (refer to FIG. 1) are determined in order to create the basic curved surface, such as the free formed surface 20.

FIG. 1 shows, with respect to the vehicle lamp 1, the curved surface reference lines 22a to 22k which extend from a point on the axis Ax. From the initial reference lines set above, these corresponding curved surface reference lines 22a to 22k are generated. These curved surface reference lines 22a to 22k are utilized to create the free formed surface 20.

Figure 5:
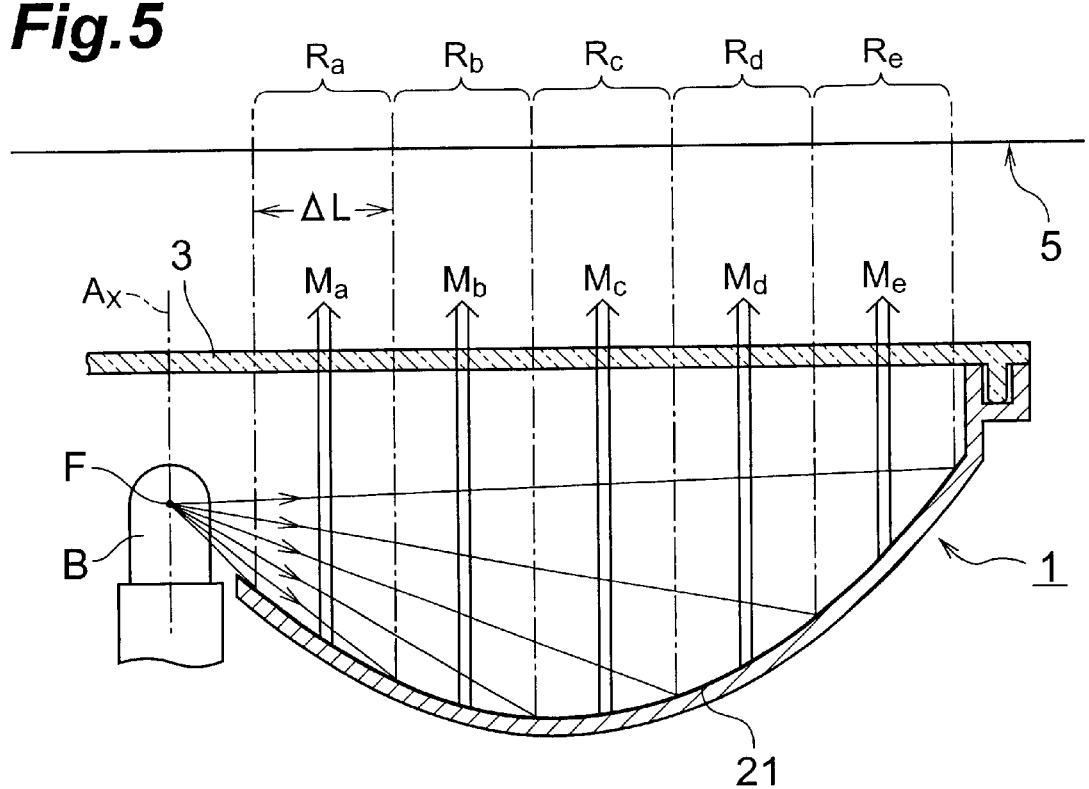
FIG. 5 is a cross-sectional view of an imaginary lamp apparatus for illustrating a method of setting initial reference lines of the reflecting mirror.

FIG. 5 shows a cross sectional view, taken along a plane defined by both axis Ax and one initial reference line in the imaginary lamp that has a curved surface containing the plurality of initial reference lines 21. Curved lines, extending radially in a number of directions in planes containing the axis Ax, are applied to the respective initial reference lines 21. One end of each of the initial reference lines is positioned on the axis Ax. The other end of each of the initial reference lines can be positioned outside or on the periphery of the lamp to be designed.

Each of the initial reference lines 21 is determined so that a luminous exitance M is made constant in each portion of the initial reference lines 21. Specifically, each of the initial reference lines 21 is divided into a number of sections between a starting point on the axis Ax and an end point corresponding to this starting point. Each of the sections has the same value of the luminous exitance M. Moreover, the initial reference lines 21 can be determined from other conditions, such as the luminous exitance, as will be described below.

The concept of the luminous exitance M is similar to that of the amount of light which travels from each section in a direction along the optical axis when the vehicle lamp is observed in the direction of the optical axis. This luminous exitance M can be used as an optical index, particularly, a relative index with respect to optical uniformity. This allows the achievement of the optical uniformity to increase while taking into consideration both the achievements of the optical uniformity and the shape restriction conditions, which is in the relation of a trade-off with that achievement.

Then, the sequence of quantitatively determining the luminous exitance M will be described by way of example. A reference plane 5 is defined so as to be perpendicular to the axis Ax. All the initial reference lines 21 are projected onto the reference plane 5. A plurality of areas, each having unit area, are arranged along the projected lines. These plural areas are projected back onto the respective initial reference lines 21 to generate unit areas associated with respective points on the initial reference lines 21. The predicted amount of light from the light source bulb B is obtained for each unit area to provide the respective luminous exitance M. If it is assumed that the incident light is reflected from each of the unit areas, we can calculate the amount of light reflected from respective unit areas. This amount of incident light can be adopted as luminous exitance M. The luminous exitance M is utilized to determine the shape of the reflecting surface 10a, and can be utilized as a determination index for improving the achievement of the optical uniformity.

Referring to FIG. 5, each initial reference line 21 is divided into a plurality of portions, for example, five areas Ra, Rb, Rx, Rd and Re each having width ΔL, such that these portions have the same length when projected on the reference plane 5. The shape of each initial reference line 21 is determined so that luminous exitance Ma, Mb, Mc, Md and Me from the respective areas become constant. Each of thus-obtained initial reference lines 21 has a convex shape, projected in the direction opposite to a direction in which light is reflected.

The above description and FIG. 5 have shown, as examples, not only a method of obtaining the luminous exitance M but also the, shapes of the initial reference lines determined by the use of the luminous exitance M. Other methods can be applied to the calculation of the luminous exitance M and the shapes, depending on the configuration of the light source bulb and the ease of calculation processing. For example, in obtaining the luminous exitance M, it is also possible to take into account not only the position of the light source bulb B and the light source point F but also other factors, such as the distribution of light from the light source bulb B.

CURVED SURFACE REFERENCE LINE CREATING STEP 103, CURVED SURFACE REFERENCE LINE CREATING MEANS 283

Then, the curved surface reference line creating means 283 creates curved surface reference lines 22 from the initial reference lines 21.

As described previously, each of the initial reference lines 21 is generated on the conditions that the luminous exitance M is made constant. Deformation is applied to each of the initial reference lines 21 so as to satisfy the shape restriction conditions, whereby the curved surface reference lines 22a to 22k are generated as shown in FIG. 1. For example, since the reflecting mirror 2 has a concave projecting rearward, the initial reference line 21 shown in FIG. 5 may not satisfy conditions such as a reduction in the thickness of the lamp. Accordingly, deformation is applied to the initial reference lines 21 so as to satisfy the shape restriction conditions. This deformation is also carried out in consideration of the amount of variation, occurring in each portion due to the deformation, in the luminous exitance M.

In addition to this deformation for achieving the shape restriction conditions, it is possible to deform the initial reference lines 21 while taking into consideration, for example, the angles made by incident rays and the initial reference lines 21. The following two lines define each angle: one is a line segment corresponding to an incident ray; and the other is a line tangent to one of the initial reference lines at a point at which that angle is to be obtained.

In the initial reference line setting step 102, attention has been paid to only the procedure that the luminous exitance M is made constant at each portion along each individual one of the initial reference lines 21. Thus, the difference in the luminous exitance M between respective ones of the initial reference lines 21 is not taken into account.

In the above-described embodiment, the eleven initial reference lines 21 are provided. The values of luminous exitance M1 to M11 for each of the initial reference lines 21 are standardized with a minimum value Mmin selected from among the luminous exitance M1 to M11. This standardized value indicates that the smaller the value, the better the optical uniformity of the vehicle lamp.

It is considered that if a parameter Mmax/Mmin, which is obtained by standardizing the maximum value Mmax with the minimum value Mmin, exceeds a predetermine range, sufficient optical uniformity can not be obtained.

In the case of insufficient optical uniformity, the process returns to, for example, the initial reference line setting step 101. In the step, another set of initial reference lines 21 can be obtained by again changing the conditions. Otherwise, a reference line having a maximum or minimum luminous exitance M can be deformed so as to decrease the Mmax/Mmin value. By the deformation or resetting of the initial reference lines, the curved surface reference lines 22 are created such that the Mmax/Mmin value falls within a suitable numerical range.

The sequence of the deformation performed in the present step is not particularly limited to the above-described one.

Figure 6:
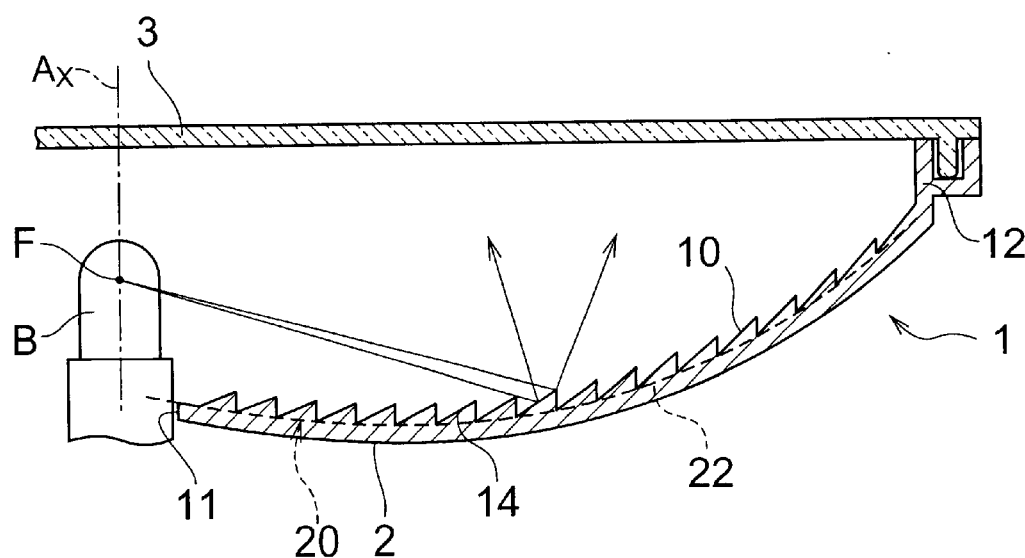
FIG. 6 is a cross-sectional view of the vehicle lamp.

Through the above-described deformation, the curved surface reference lines 22, shown by a dashed line in FIG. 6, is obtained from the initial reference line 21 shown in FIG. 5.

FREE FORMED SURFACE CREATING STEP 104, FREE FORMED SURFACE CREATING MEANS 284

The free formed surface creating means 284 creates the free formed surface 20, which constitutes the basic curved surface for the reflecting surface 10a, from the curved surface reference lines 22.

Figure 7:
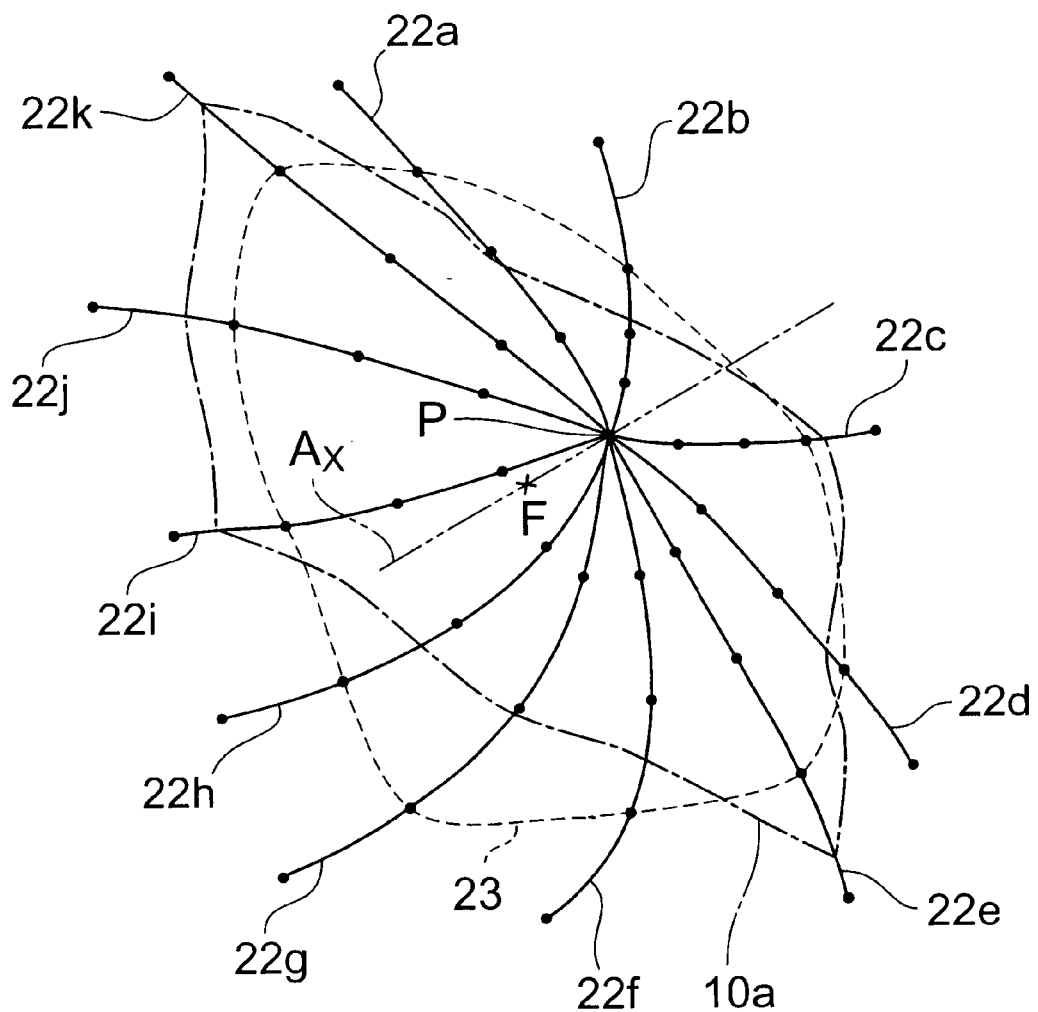
FIG. 7 is a view showing a method generating a free formed surface.

FIG. 7 is a view illustrating a method of creating the free formed surface 20. Referring to FIG. 7, the free formed surface can be generated in the following sequence. The external shape, which is rectangular as seen in the direction of the optical axis Ax as shown in FIG. 1, of the free formed surface 20 is shown by a dot-dashed line denoted by reference numeral 20a in FIG. 7. The area within the dot-dashed line shown in FIG. 7 can be used as the basic curved surface, i.e., the free formed surface 20 for the reflecting surface 10a. In FIG. 7, the curved surface reference lines 22a to 22k in the reflecting surface 10a correspond to the curved lines shown by dashed lines in FIG. 1. On the display device, the curved surface reference lines 22a to 22k, the center P, the light source point F and the external shape of the free formed surface 20 can be displayed.

In order to obtain the free formed surface which completely covers the reflecting surface 10a, the other ends of the curved surface reference lines 22a to 22k are positioned outside the range of a free formed surface to be cut out in FIG. 7.

In order to create the good free formed surface 20, it is preferable to utilize all the curved surface reference lines 22a to 22k. As shown in FIG. 7, in the method of creating the free formed surface of the present embodiment, each of the curved surface reference lines 22a to 22k is divided into a number of portions.

As will be described by way of example, each of a plurality (n) of curved surface reference lines 22 (n is an integer greater than 2) is divided into a plurality of (m) of parts (m is an integer greater than 1) each having the same length to form a plurality (m) of division points including the outer end point. The corresponding division points selected from the respective curved surface reference lines 22 are grouped. A curved line connects the points in each group with each other to create a plurality (m) of free curved lines 23. The free formed surface 20 can be generated from the plurality (m) of free curved lines 23. Regarding the number by which each of the curved surface reference lines 22 is divided in each individual example, the division number m can be chosen so as to obtain the smooth free formed surface 20. In FIG. 7, by way of example, the free curved lines 23 are shown by dashed lines to clarify the respective groups containing the corresponding points. The free formed surface 20 is made from all the free curved lines 23.

The following can also be applied to the method of connecting division points with each other to create one free curved line, and the method of creating a curved surface containing the free curved lines.

First of all, division points q1 to qj (j≧3) are obtained by deviating one or more division points p1 to pi (i≧3) in each group with respect to their original positions. A curved line is formed by sequentially connecting these points pi and qj with one another. A part of this curved line corresponding to one turn can be selected from the curved line to form one free curved line. This free curved line can be a closed curved line. However, No one has known yet whether sufficiently smooth connection can be obtained or not.

In the above-described sequence, the basic curved surface for defining the reflecting mirror are obtained on the basis of the shape restriction conditions, which define the accommodating space for the reflecting mirror as well as the position of the light source in the vehicle lamp.

As an result of the above-described sequence, the free formed surface, which has luminous exitance M within a predetermined range and which satisfies the shape restriction conditions, can be obtained. The smooth curved surface reference lines are generated in the directions of radius vectors from the center of the reflecting mirror. However, it cannot necessarily be guaranteed that the curved surface, formed on the curved surface reference lines, can achieve the allowable degree of smoothness at portions, such as the joint of the curved surface.

The free formed surface can generated by methods other than those described above in the. present embodiment. It cannot necessarily be guaranteed that free formed surfaces generated by the above techniques have practical smoothness in the directions of radius vectors.

In the above-described steps, it is not yet verified whether the generated free formed surface 20 is appropriate as the basic curved surface for the reflecting mirror. In addition, the entire shape of the free formed surface can be seen merely by displaying the free formed surface on the display device. But it is difficult to judge whether the free formed surface has a practical range of smoothness.

VERIFICATION STEP 105, VERIFICATION MEANS 285

The verification step 105 for making verification of the basic curved surface will be described below. The verification step 105 comprises input step 105a, plane surface generating step 105b, plane surface displaying step 105c, line-of-intersection generating step 105d, and curved line displaying step 105e. Moreover, the verification step 105 comprises basic curved surface displaying step 105f and erasure step 105g. Curved line verification step 106 verifies, based on a displayed image, whether or not the free formed surface has a sufficient degree of smoothness. The verification means 285 comprises condition input means 285a, plane surface generating means 285b, line-of-intersection generating means 285d, erasure means 285g, and transmitting means 285c, 285e and 285f.

CONDITION INPUT STEP, 105a, CONDITION INPUT MEANS 285a

Verification of the basic curved surface can be made as a series of processes according to the flowchart 100 shown in FIG. 3. However, since the verification step 105 makes an evaluation as to whether designed intermediate data has predetermined performance, the verification step 105 can be realized by a verification software different from a design software for generating the curved surface.

When the verification step 105 is realized by another software, light source data on design information indicative of the basic curved surface and the light source is introduced by the condition input means 285. In addition, to realize the verification step 105 by one module embedded in a series of software modules, the input step is realized by the condition input means 285a which transmits and receives predetermined information to and from a verification block corresponding to one of the modules. The input data is stored in the memory unit 220 as shown in FIG. 4.

PLANE SURFACE GENERATING STEP 105b, PLANE SURFACE GENERATING MEANS 285b

Figure 8A:
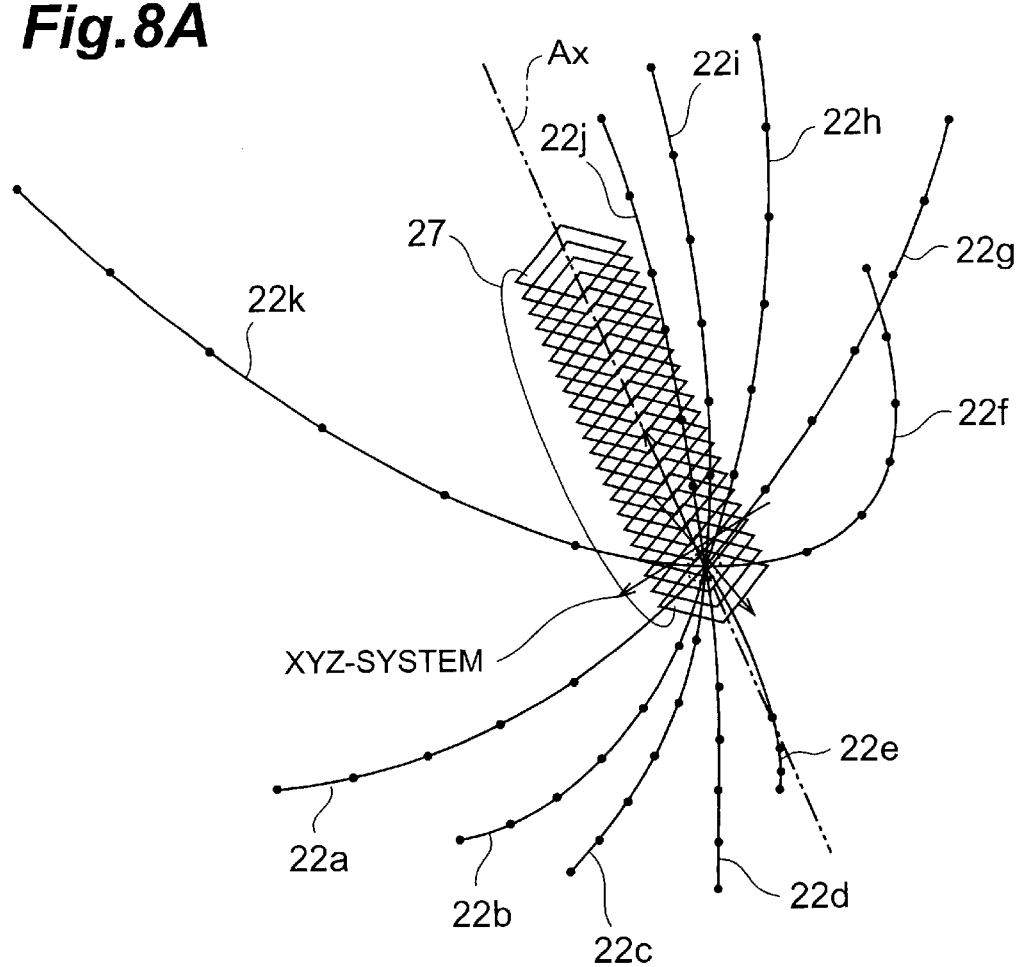
FIG. 8A is a view showing an image of curved surface reference lines and plane surfaces.
Figure 8B:
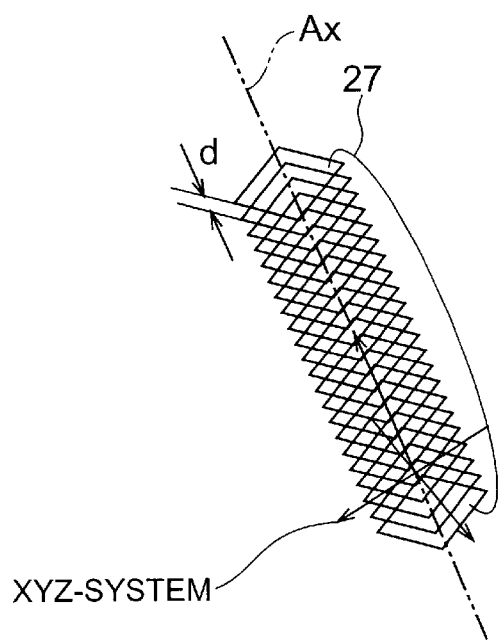
FIG. 8B is a view showing an image of the displayed planes.

The plane surface generating means 285b generates one or more planes with reference to the axis Ax. In FIGS. 8A and 8B, generated plane surfaces intersect the axis Ax at a predetermined angle, for example, at right angles. To generate a plurality of planes, plane surface information is required. The plane surface information defines at least one of the number s of the planes and the distance d between the planes. Such plane surface information is temporarily stored in memory unit 220. In a verification software, it is possible to make the distance d constant only with the number s of the plane surfaces being variable, or it is possible to make the number s constant only with the distance d between the planes being variable, or it is possible to make both the distance d and the number s constant. Plane surface data for the plane surfaces, which intersect the axis, is generated according to the number s and the distance d.

PLANE SURFACE DISPLAYING STEP 105C, PLANE SURFACE DATA TRANSMITTING MEANS 285c

The generated plane surface data is transmitted to the display device via the transmitting means 285c and can be displayed to form an image. owing to such display, the execution of the step 105c is confirmed, and it is possible to perform the subsequent process while referring to this image. However, instead of this display, the following step can also be performed. FIG. 8B shows an image, displayed on the display device, of small-sized planes 27.

LINE-OF-INTERSECTION GENERATING STEP 105d, LINE-OF-INTERSECTION GENERATING MEANS 285d

The line-of-intersection generating means 285d obtains lines of intersection between the respective planes 27 and the free formed surface 20 (basic curved surface) on the basis of the design information and the plane surface data, and generates closed curved line data from these lines of intersection. The generated closed curved line data is stored in the memory unit 220.

When the plane surface data are generated such that the planes are arranged in. parallel at a constant interval, the closed curved line data can be considered to represent the contours of the free formed surface. Specifically, when the interval between the lines of intersection is narrow, this indicates that the inclination of the free formed surface 20 is large, and when the interval between the lines of intersection is wide, this indicates that the inclination of the free formed surface 20 is small. In the case where the free formed surface has a local concave or convex portion, the number of closed curved lines, generated by the intersections of the free formed surface and one plane surface, is two or more. Moreover, the contours provides information on the depth of the lamp along the axis Ax, i.e., which portion of the reflecting surface determines the depth of the reflecting mirror.

CLOSED CURVED LINE DISPLAYING STEP 105e, CLOSED CURVED LINE DATA TRANSMITTING MEANS 285e

Figure 9:
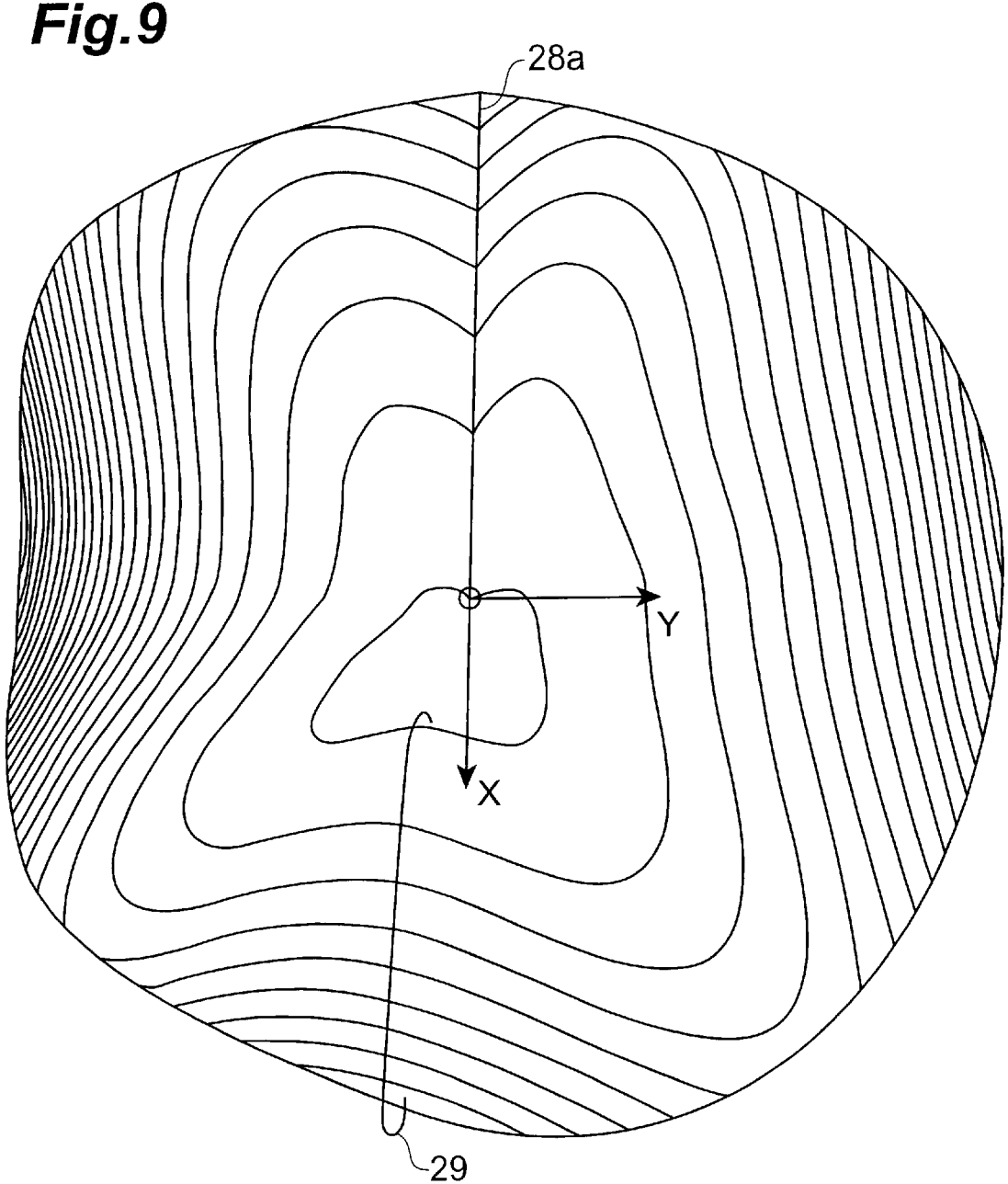
FIG. 9 is a view showing an image of displayed closed curved lines.
Figure 10:
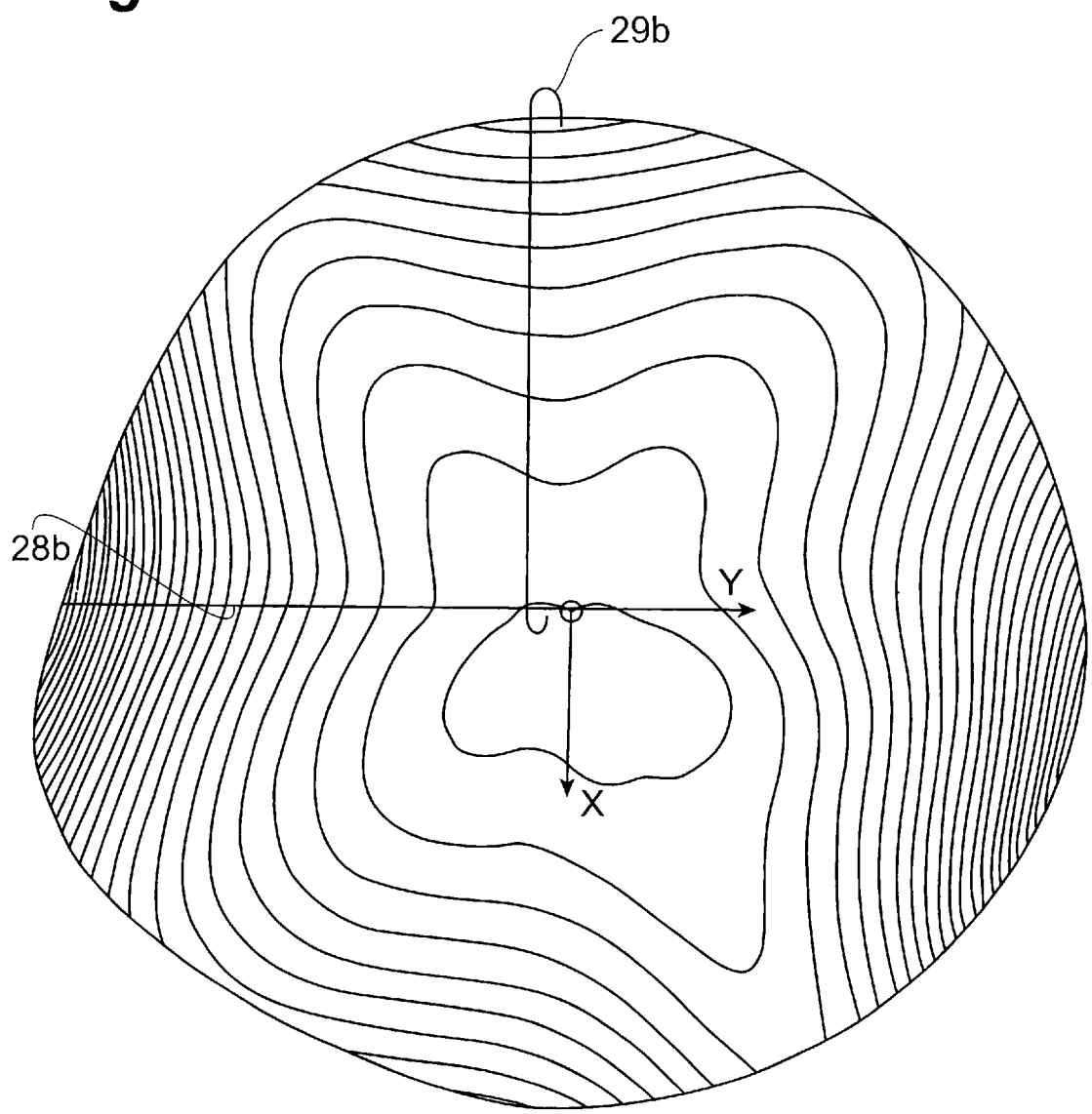
FIG. 10 is a view showing an image of displayed closed curved lines.

The closed curved line data, representative of the one or more closed curved lines included in the basic curved surface, is transmitted to the display device via the transmitting means 285e included in the evaluation system. In the case where no display has been provided in the plane surface displaying step 105b, the planes (reference numeral 27 in FIGS. 8A and 8B) that intersect this axis Ax, together with or independently of the closed curved line data, can be transmitted to the display device. The display device receives a series of data including the closed curved line data to display the closed curved lines and, for example, the axis Ax and the light source point F if contained in the data. FIGS. 9 and 10 show images of closed curved lines 29a and 29b displayed on the display device, respectively.

BASIC CURVED SURFACE DISPLAYING STEP 105f, BASIC CURVED SURFACE TRANSMITTING MEANS 285f

Data, corresponding to the basic curved surface, in the design information can also be transmitted to the display device via the transmitting means 285f so that the basic curved surface can be displayed thereon. In this step, an image of the basic curved surface can be superposed on an image of the lines of intersection indicated by the closed curved lines. The basic curved surface displaying step 105f can be provided before and after any step in the verification step 105, and then may not be executed in the verification step 106.

By superimposing the free formed surface on the images of the closed curved lines, it is possible to obtain information on a portion which does not exhibit a sufficient degree of smoothness while that portion is associated with the corresponding area on the basic curved surface. The image of the basic curved surface can include data on the external shape of the reflecting mirror.

DISPLAY ERASURE STEP 105g, ERASURE MEANS 285g

In an evaluation of the free formed surface, there is a case where it is required to display closed curved lines generated in a different number of planes as well as a different distance between planes. In this case, it is convenient to display new evaluation information on the display device after the previous image of the closed curved lines has been erased by the erasure means 285g from the display device. To display new evaluation information, the lines of intersection between the free formed surface and planes are transmitted to the display device via appropriate transmitting means, and the plane surface data is generated from the different number of the planes as well as the different distance between the planes. These display and erasure can be repeatedly performed. With this process, it is possible to make evaluation and verification of the free formed surface with various numbers of planes and various distances between planes.

Further, it is possible to display the lines of intersections between these planes and the free formed surface while sequentially moving the position of one plane surface along the axis Ax. In this case as well, it is preferable to erase an image of the old lines of intersections before displaying new lines of intersections. In addition, it is possible to display the sequentially obtained lines of intersections on the display device in a superposed manner without erasure.

SMOOTHNESS DEGREE VERIFICATION STEP 106

A determination based on the displayed image is made in the smoothness degree verification step 106.

In the image displayed in FIG. 9, a plurality of closed curved lines, surrounding the axis Ax, are displayed. At the intersections, on a joining line 28a of the free formed surface 20, of closed curved lines and a curved surface reference line which extends in the direction of a radius vector, there is a great difference between the right and left derivatives on each of the curved surface reference lines. As a result, it cannot be determined that the basic curved surface has a range of practical smoothness.

If reflecting surface elements are applied to such basic curved surface to form a reflecting mirror, optical uniformity is not satisfied in areas that is inferior in smoothness degree. In the area that is inferior in smoothness, incident light is not sufficiently reflected along the direction of the axis Ax and such area looks dark when observed from the direction of the axis Ax. Consequently, such a lamp does not exhibit sufficient performance.

In the image displayed in FIG. 10, a plurality of closed curved lines, surrounding the axis Ax, are displayed. At the intersections, on a joining line 28a of the free formed surface 20, of closed curved lines and a curved surface reference line which extends in the direction of a radius vector, the difference between the right and left derivatives is sufficiently small on each of the curved surface reference lines. Therefore, it can be determined that the basic curved surface has a practical range of smoothness.

If it is determined that the basic curved surface is not appropriate for use in the vehicle lamp, predetermined steps for the generation of the basic curved surface are executed again. By this repetition of the steps, a free formed surface exhibiting predetermined performance can be obtained.

Even when the line of intersection of one plane and a free formed surface is visualized, the degree of smoothness can be obtained on this intersection line.

Accordingly, FIGS. 9 and 10 show that a designer can observe the conformity of the basic curved surface as a whole. On the basis of this observation, the designer cab determine whether redesigning is needed or the design process goes to the next design step.

In a determination indicating that redesigning is needed, first of all, it is necessary to determine, again, predetermined design information, such as a free formed surface which constitutes a basic curved surface.

If the process go to the next design step, the following reflecting surface determining step 107 can be performed.

REFLECTING SURFACE DETERMINING STEP (STEP 107), REFLECTING SURFACE DETERMINING MEANS 287

Then, the reflecting surface determining means 287 divides the free formed surface 20 into segments and provides these segments with the reflecting surface element 14. The reflecting surface 10a is formed in this manner.

Figure 11:
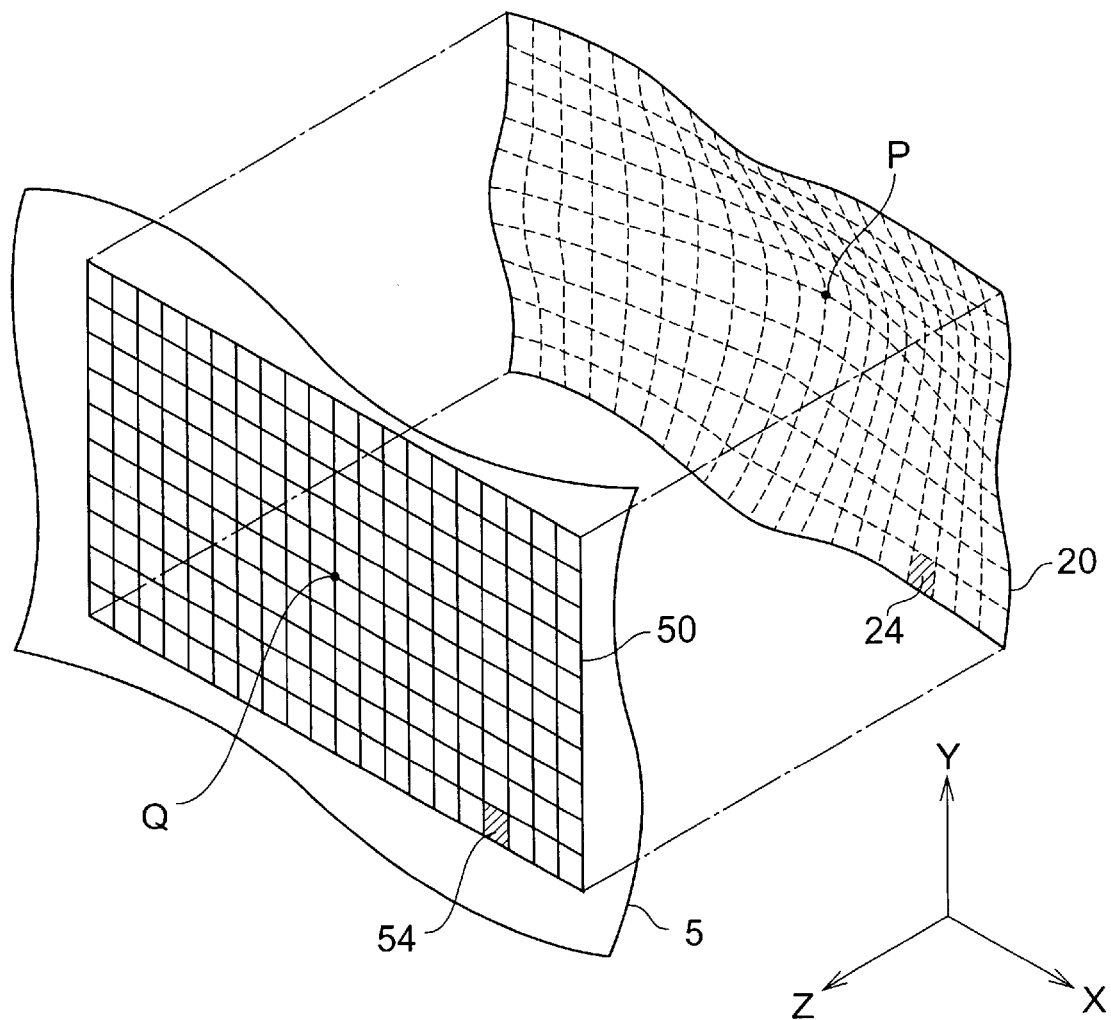
FIG. 11 is a perspective view showing a method of dividing a free formed surface into segments arranged in an array.

FIG. 11 is a view showing the segments of the free formed surface 20. Referring to this figure, the free formed surface can be generated in the following sequence. The arrayed structure of these segments corresponds to the structure of the reflecting surface 10a as shown in FIG. 2.

Although segmentation is achieved by directly dividing the free formed surface 20, the reference plane 5, perpendicular to the axis Z as shown in FIG. 11, is used in this embodiment. A point P on the axis Ax is projected to a point Q on the reference plane 5. Within a reflecting-surface shape 50, the reference plane 5 is divided into reference segments 54. The reference segments 54 are arranged in an array at constant pitches, respectively, along the X-axis and Y-axis that are perpendicular to each other. Then, the reference segments 54 are projected onto the free formed surface 20 to generate segments 24 arranged in array form. In FIG. 11, one of the segments 24 is hatched on the free formed surface 20. Various other methods can be applied in order to generate segments on the free formed surface 2.

As shown in FIG. 2, the reflecting surface elements 14 are assigned to the respective segments 24 on the free formed surface 20. In this manner, the reflecting surface 10 is formed as shown in FIG. 6. The reference segment 54 and the segment 24, which are hatched in FIG. 11, correspond to the reflecting surface element 14 hatched in FIG. 2.

As described previously in reference to FIGS. 1 and 2, the reflecting surfaces of the respective reflecting surface elements 14 are made of paraboloid of revolution which has the optical axis Ax as its central axis and has the light source point F as its focus, but has different focal lengths. Deformation can be applied to the paraboloid of revolution of the reflecting surface elements 14 so as to provide the respective reflecting surface elements 14 with predetermined light diffusing capability, whereby the reflecting surfaces of the respective reflecting surface elements 14 can be obtained.

Referring to the reflecting basic surface 15 shown in FIG. 12, the determination of the reflecting surface elements 14 will be described below. With respect to the reflecting basic surface 15, the reflecting surface elements 14 are assigned to the respective segments 24 to form the reflecting surface 10a.

If the reflecting surface 10a is provided such that the reflecting surface elements 14 are disposed on the free formed surface 20 in this manner, it is possible to easily realize a vehicle lamp which satisfies the conditions that are currently required for the vehicle lamp 1, for example, optical uniformity and light diffusing feature in terms of its reflecting performance, a reduction in thickness in terms of its shape, and transparency in terms of its appearance of the vehicle lamp.

To realize such a vehicle lamp, each reflecting surface element 14a has diffusing reflecting area having light diffusing capability that can be provided in the whole or part of the paraboloid of revolution. The diffusing reflecting area has a curved surface capable of reflecting received light in a diffusing manner. The light diffusing capability is the function not only to reflect light, parallel to the optical axis, received from a light source, but also to distribute the received light over a predetermined angular range with respect to the optical axis.

If each of the reflecting surface elements 14 has such light diffusing capability, it is possible to use the lens 3 having a low light diffusing capability as well as exhibiting transparency. Thus, each of the reflecting surface elements 14 can satisfy light diffusing feature, which is one functional condition, as well as transparency and depth, which are external-appearance restriction conditions, to the vehicle lamp.

Figure 12:
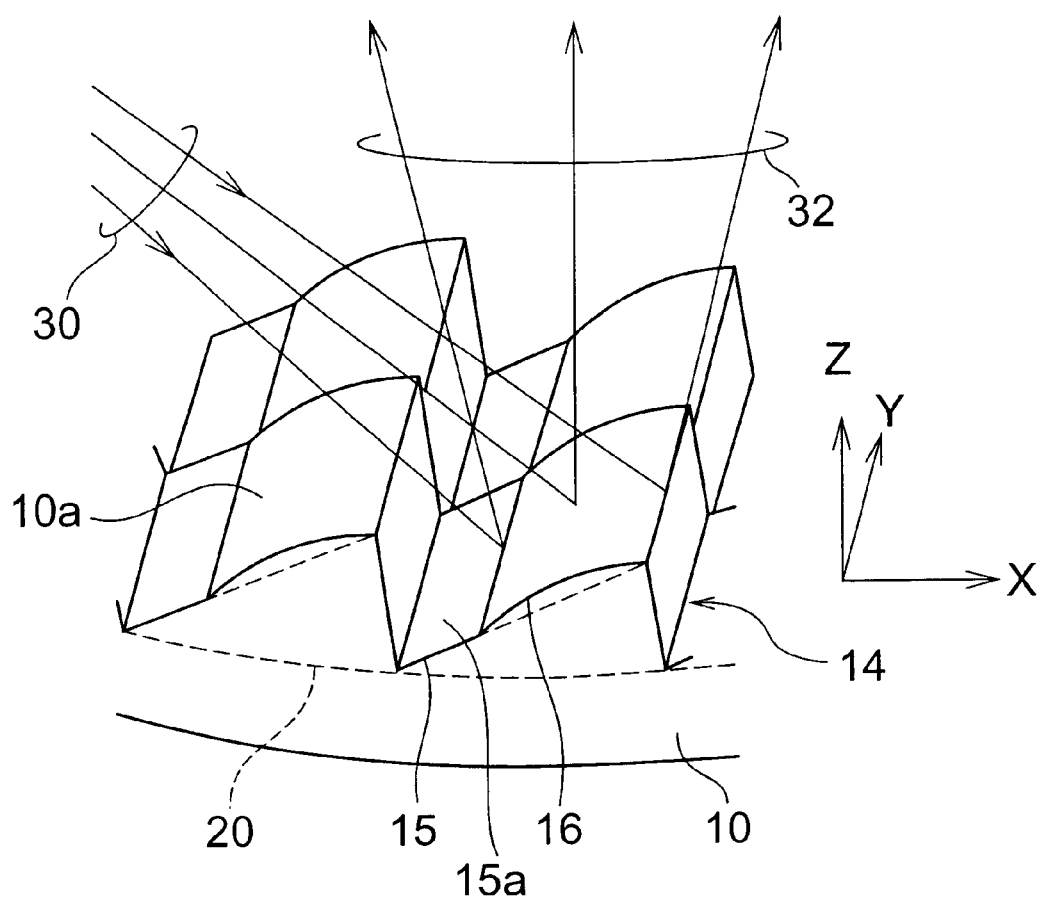
FIG. 12 is a perspective view showing one example of a reflecting surface element.

Each of the reflecting basic surfaces of the reflecting surface elements 14 as shown in FIG. 12 comprises a paraboloid portion 15a and a diffusing reflecting portion 16. In the present embodiment, a paraboloid of revolution is adopted to the reflecting basic surface 15, and the diffusing reflecting area 16, which is deformed so as to gain a predetermined light diffusing function, is assigned to whole or part of the paraboloid of revolution. Accordingly, each of the reflecting surface elements 14 is made of the paraboloid portion 15a and the diffusing reflecting portion 16. The paraboloid portion 15a is represented as the shape of revolution paraboloid of focal length fx. The diffusing reflecting portion 16 has a convex form with respect to revolution paraboloid of focal length fx such that the diffusing reflecting portion 16 exhibits a predetermined light diffusing function.

The paraboloid portion 15a is assigned to the portion behind the adjacent reflecting surface element 14, and the diffusing reflecting portion 16 is assigned to the portion that light from the light source bulb B (light source position) reach actually. Thus, incident light 30 becomes reflected light 32 through a reflection in the diffusing reflecting portion 16.

The diffusing reflecting portion 16 of the reflecting surface element 14 has a shape represented by a predetermined cylindrical side surface extending in the Y-axis direction so that the diffusing reflecting portion 16 has a light diffusing function in only the X-axis direction. Thus, approximately parallel light is reflected in the Y-axis direction. In this case, the lens 3 (refer to FIG. 1), having lens steps 3a capable of diffusing light in the Y-axis direction, is used as the lens.

This diffusing reflecting portion can adopt a surface shape capable of diffusing light in both of the X- and Y-axis directions. It is possible to adopt a surface shape without diffusing reflecting portions. In this case, the incident light can be diffused by only the lens. The shape of the diffusing reflecting area is not limited to the above-described example, and can employ a cylindrical concave shape, and a plane instead of a paraboloid of revolution in addition to a cylindrical convex shape. A Bézier curved surface or a NURBS curved surface can also be used as this diffusing reflecting surface.

The shape of each segment, generated to segment the reflecting surface 10a, is not limited to a rectangular as shape shown in the present embodiment. It is possible to create the reference segments 54 by segmenting a region inside the reflecting surface shape 50 in the directions of radius vectors about the intersection of the reference plane 5 and the optical axis Ax and concentrically about the intersection. If the reference segments 54 are projected, the shapes of the segments 24 and the reflecting surface elements 14 have the shapes of sectors as seen from the Z-axis direction. Other shapes of the segments can be used for the reflecting surface 10a. The kind of lamps is not limited to the indicator lamp, and the above-described method can be used for reflecting mirrors for use in various kinds of vehicle lamps.

As described above in detail with reference to the drawings, in the evaluation method and the evaluation system are applicable to the evaluation of the optical performance of the basic curved surface. The curved lines are produced so as to be included both in the basic curved surface and in the plane surfaces intersecting a predetermined axis, and are displayed. Each curved line represents a cross section, taken along each planes, of the basic curved surface. By displaying this cross section, the shape of the basic curved surface can be visualized with respect to a direction in which light from a light source is reflected. A process for realizing these sequences can be stored as a program on a computer-readable storage medium.

It is, therefore, possible to provide as follows: a method for evaluating a basic curved surface for a reflecting mirror to be applied to a vehicle lamp; an evaluation system therefor; and a computer-readable medium storing a program that enables a computer to execute evaluation of a basic curved surface for a reflecting mirror to be applied to a vehicle lamp.

What is claimed is:

1. A method of evaluating a basic curved surface for a reflecting mirror to be applied to a vehicle lamp, comprising the steps of:

a) entering light source information on a light source and design information indicative of the basic curved surface; and b) displaying, on a display device, closed curved line data representative of one or more closed curved lines, said closed curved lines being included both in the basic curved surface and one or more planes intersecting an axis, said axis extending in a direction in which light from the light source is to be reflected by said reflecting mirror, and said axis passing through a light source position defined by the light source information.

2. The method according to claim 1, further comprising the steps of:

c) generating plane surface data indicative of said planes intersecting the axis; and d) obtaining one or more lines of intersection of said planes and the basic curved surface on the basis of the design information and the plane surface data to create the closed curved line data.

3. The method according to claim 2, further comprising the step of:

e) entering plane surface information which defines at least one of the number of and the distance between the planes;

wherein the plane data represents planes arranged with the distance and the number defined by the plane surface information and the planes are perpendicular to the axis.

4. The method according to claim 1, wherein the step (b) includes a step of displaying the closed curved line data such that the, closed curved lines are superposed on the basic curved surface displayed on the basis of the design information.

5. The method according to claim 2, wherein the step (b) includes a step of displaying the closed curved line data such that the closed curved lines are superposed on the basic curved surface displayed on the basis of the design information.

6. The method according to claim 3, wherein the step (b) includes a step of displaying the closed curved line data such that the closed curved lines are superposed on the basic curved surface displayed on the basis of the design information.

7. An evaluation system for evaluating a basic curved surface for a reflecting mirror to be applied to a vehicle lamp, comprising:

a memory;

a display device;

first input means for entering design information indicative of the basic curved surface and light source information on a light source to store said memory; and first transmitting means for transmitting, to the display device, closed curved line data representative of one or more closed curved lines, said closed curved lines being included both in the basic curved surface and one or more planes intersecting an axis, said axis extending in a direction in which light from the light source is to be reflected by the reflecting mirror, and said axis passing through a light source position defined by the light source information.

8. The evaluation system according to claim 7, further comprising:

plane surface generating means for generating plane surface data indicative of the planes intersecting the axis; and line-of-intersection generating means for generating the closed curved line data indicating lines of intersection of the planes and the basic curved surface on the basis of the design information and the plane surface data.

9. The evaluation system according to claim 8, further comprising:

second input means for entering plane surface information which defines at least one of the following: the number of the planes and the distance between the planes;

wherein the plane surface data represents planes arranged with the distance and the number defined by the plane surface information and the planes are perpendicular to the axis.

10. The evaluation system according to claim 7, further comprising erasure means for erasing a display image of the closed curved line data from the display device.

11. The evaluation system according to claim 8, further comprising erasure means for erasing a display image of the closed curved line data from the display device.

12. The evaluation system according to claim 9, further comprising erasure means for erasing a display image of the closed curved line data from the display device.

13. A computer-readable storage medium on which a program is stored, said program enabling a computer to execute evaluation of a basic curved surface for a reflecting mirror to be applied to a vehicle lamp, said program including the processes of:

entering light source information on a light source and design information indicative of the basic curved surface; and displaying, on a display device, closed curved line data representative of one or more closed curved lines, said closed curved lines being included both in the basic curved surface and in one or more planes intersecting an axis, said axis extending in a direction in which light from the light source is to be reflected by the reflecting mirror and said axis passing through a light source position included in the light source information.

14. The storage medium according to claim 13, said program further comprising the processes of:

generating plane surface data indicative of the planes intersecting the axis; and obtaining lines of intersection of the planes and the basic curved surface on the basis of the design information and the plane surface data to create the closed curved line data.

15. The storage medium according to claim 14, said program further comprising the processes of:

entering plane surface information which defines at least one of the number of the planes and the distance between the planes, wherein, in the processes of generating plane surface data, the plane surface information is generated to represent planes arranged with the distance and the number defined by the plane surface information and said planes being perpendicular to the axis.

16. A storage medium according to claim 13, wherein the display process displays the closed curved line data such that the closed curved lines are superposed on the displayed data, defined by the design information, indicative of the basic curved surface.

17. A storage medium according to claim 14, wherein the display process displays the closed curved line data such that the closed curved lines are superposed on the displayed data, defined by the design information, indicative of the basic curved surface.

18. A storage medium according to claim 15, wherein the display process displays the closed curved line data such that the closed curved lines are superposed on the displayed data, defined by the design information, indicative of the basic curved surface.

* * * * *